(No Model.)
A. A. STEVENSON.
MANUFACTURE OF WHEELS.
No. 600,809. Patented Mar. 15, 1898.
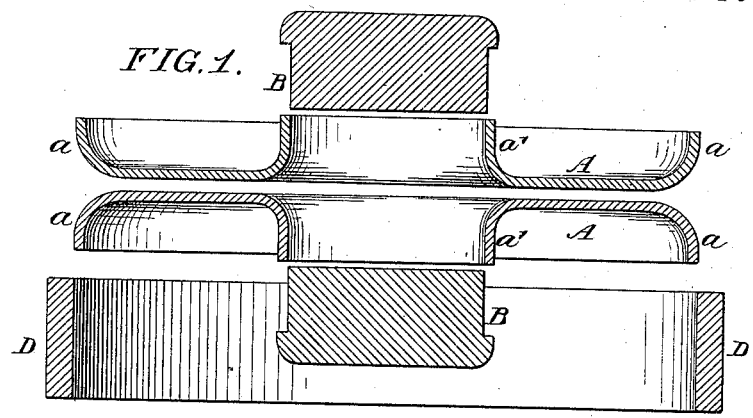
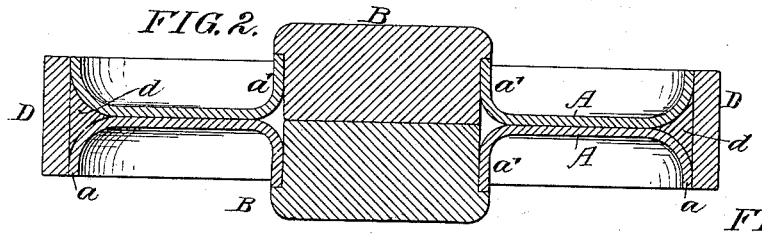
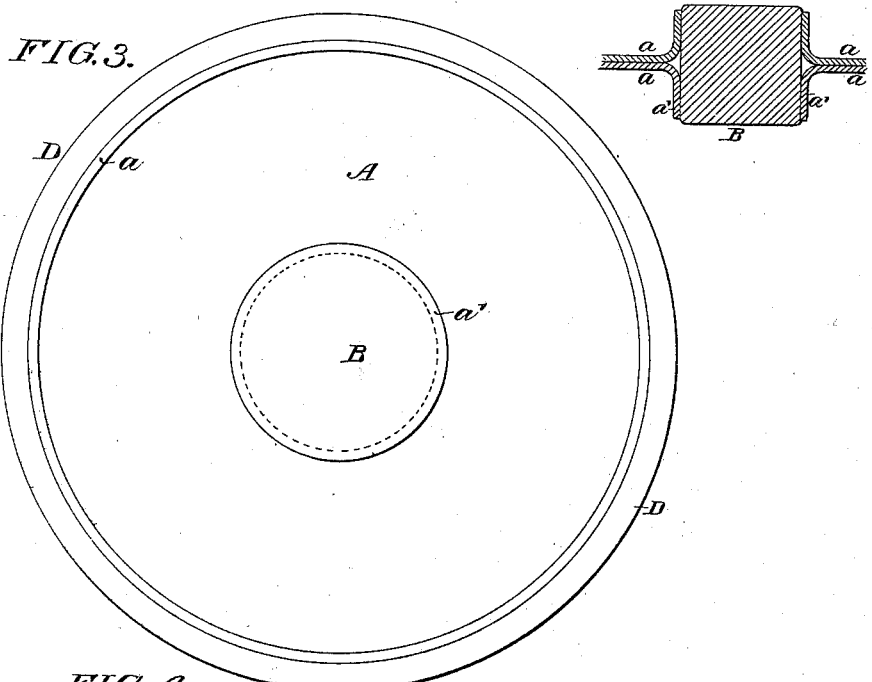
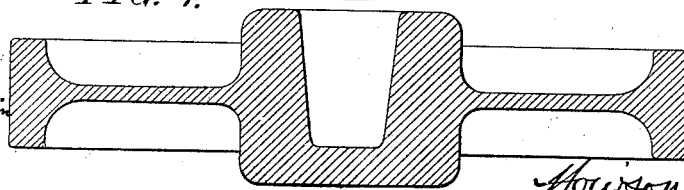
Witnesses:
C. D. Goodwin
N. W. A. Barr
Inventor:
Archy A. Stevenson
by his Attorneys
Howson & Howson

UNITED STATES PATENT OFFICE.

ARCHY A. STEVENSON, OF BURNHAM, PENNSYLVANIA.

MANUFACTURE OF WHEELS.

SPECIFICATION forming part of Letters Patent No. 600,809, dated March 15, 1898.

Application filed July 22, 1896. Serial No. 600,147. (No model.)

*To all whom it may concern:*

Be it known that I, ARCHY A. STEVENSON, a citizen of the United States, and a resident of Burnham, Pennsylvania, have invented certain Improvements in the Manufacture of Wheels, of which the following is a specification.

My invention relates to the manufacture of wrought-metal wheels; and the object of my invention is to so flange the plates that the fillets at the junction of the hub and the web of the wheel will be formed by the plates instead of by the hubs, as in my former patent, No. 531,072, dated December 18, 1894.

In the accompanying drawings, Figure 1 is a sectional view showing the several parts before assemblage. Fig. 2 is a view showing the parts assembled. Fig. 3 is a plan view showing the assembled parts. Fig. 4 is a view of a finished wheel-center, and Fig. 5 is a view of a modification.

In making a wheel according to my former patent it was necessary to construct a special form of hub in order to provide suitable metal for the fillets at the joint of the plate or web and the hub. This construction made the joint between the hub and the plate directly at the fillets and made it necessary to provide hubs of a special form.

Referring to the drawings, A A are two flanged plates each having a peripheral flange $a$ and an internal flange $a'$. This internal flange forms part of the hub, while the peripheral flange forms part of the rim of the wheel or wheel-center.

B B are the two hub-sections, made solid in the present instance. Each hub-section is enlarged at one end, so that the two hubs when placed together form a channel for the reception of the two internal flanges of the plates A A.

D is the outer ring or tire of the wheel-center or wheel, within which the parts are assembled, and a suitably-shaped ring $d$ may be inserted in the space formed by the ring D and the rounding of the plates A A, although in some instances scraps or pieces of metal may be placed in this space instead of a special-formed piece. The space formed by the hubs and the rounded portions of the two plates can be filled with scrap, if desired. The parts being thus assembled, as shown in Fig. 2, constitute a pile ready for welding the wheel.

It will be noticed that the fillets at the junction of the hub with the plates are practically formed before the assembled elements are subjected to the welding process and that the joints between the hub and the two plates are some distance away from the fillets, so that after the parts are assembled and heated to the welding heat and placed between suitably-shaped dies and formed into a unitary structure the fillets are formed wholly by the plate-sections and not by the hub-sections.

The hub-sections B B may be heated in advance when necessary, in order that the parts when subjected to the welding heat will be brought to the welding heat simultaneously, so that any one part is not overheated.

I have shown the hub-sections plain, but one may be provided with a socket and the other with a projection adapted to the socket, by which they are attached together before being subjected to the welding heat, and in some instances a single hub-section may be used, as shown in Fig. 5, without a flange.

I have illustrated my invention as applied to wheel-centers to which tires are afterward attached; but it will be understood that while my invention is especially adapted for car-wheels it may be used on pulleys, traction-wheels, gear-wheels, &c.

I claim as my invention—

1. The process herein described of making wrought-metal wheels or wheel-centers, said process consisting in perforating two plates and forming a flange on each plate around the perforations at right angles to the body of the plate, placing the two plates back to back, heating a hub-section, inserting the said heated section in the opening formed by the assembling of the plates so that the flanges will rest against the sides of the hub-section, and then heating the composite structure to a welding heat and finally subjecting it to the action of dies whereby it is formed into a solid mass, substantially as described.

2. The process herein described of making wrought-metal wheels or wheel-centers, said process consisting in perforating two plates and forming a flange on each plate around the perforations at right angles to the body of the plate, placing the two plates back to back, forming two hub-sections with enlargements at one end, heating the said hub-sections, then inserting them in the opening formed by the assembling of the plates, so that the flanges will rest against the sides of the hub-sections under the enlargements, then heating the composite structure to a welding heat, and finally subjecting it to the action of dies whereby it is formed into a solid mass, substantially as set forth.

3. A pile for a wrought-metal wheel or wheel-center consisting of the following assembled parts, an annular ring-section, two perforated plate-sections each having an external and an internal flange at right angles to the body and two hub-sections adapted to rest in the perforations of the plate-sections and enlarged to extend over the internal flanges of the plates, substantially as set forth.

In testimony whereof I have signed my name to this specification in the presence of two subscribing witnesses.

ARCHY A. STEVENSON.

Witnesses:
JAS. C. JACOBS,
T. A. CRISSMAN.